(12) United States Patent
Wagner et al.

(10) Patent No.: US 12,158,771 B2
(45) Date of Patent: Dec. 3, 2024

(54) CLOCK GATING CIRCUIT FOR AVOIDING OUT-OF-SPEC CLOCK OPERATIONS IN SELF-TIMED CIRCUITS

(71) Applicant: International Business Machines Corporation, Armonk, NY (US)

(72) Inventors: Israel A. Wagner, Zichron Yaakov (IL); Hezi Shalom, Tel Aviv (IL); Noam Jungmann, Holon (IL); Elazar Kachir, Haifa (IL); Tomer Abraham Cohen, Binyamina (IL)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 18/194,337

(22) Filed: Mar. 31, 2023

(65) Prior Publication Data
US 2024/0329684 A1   Oct. 3, 2024

(51) Int. Cl.
| | |
|---|---|
| *G06F 1/08* | (2006.01) |
| *G06F 1/04* | (2006.01) |
| *G06F 1/10* | (2006.01) |
| *G06F 1/12* | (2006.01) |
| *G06F 1/3237* | (2019.01) |

(52) U.S. Cl.
CPC .................. *G06F 1/08* (2013.01); *G06F 1/04* (2013.01); *G06F 1/10* (2013.01); *G06F 1/12* (2013.01); *G06F 1/3237* (2013.01)

(58) Field of Classification Search
CPC . G06F 1/08; G06F 1/12; G06F 1/3237; G06F 1/10; G06F 1/04
USPC .................. 713/400, 500, 501, 502, 601
See application file for complete search history.

(56) References Cited

U.S. PATENT DOCUMENTS

| | | | |
|---|---|---|---|
| 4,660,169 A * | 4/1987 | Norgren .................. | G06F 13/37 710/111 |
| 5,553,276 A | 9/1996 | Dean | |
| 5,987,620 A | 11/1999 | Tran | |

(Continued)

OTHER PUBLICATIONS

Xinchao Shang et al., "Low Overhead and Fast Reaction Adaptive Clocking System for Voltage Droop Tolerance," Chinese Journal of Electronics, Dated: May 1, 2019, pp. 1-5.

(Continued)

*Primary Examiner* — Ji H Bae
(74) *Attorney, Agent, or Firm* — Patterson + Sheridan, LLP (57) ABSTRACT

A clock gating method and circuit for avoiding out-of-spec clock operations. The circuit comprises a clock gating section that gates a clock signal according to an enabling signal generated by an enabling signal controller, the enabling signal controller generating the enabling signal according to a set signal and a reset signal. The circuit further comprises a set signal generator that generates the set signal, a reset signal generator that generates the reset signal, and a feedback section that uses the enabling signal to generate the feedback signal for the reset signal generator. The reset signal generator generates the reset signal by using the feedback signal. The enabling signal controller further generates an acknowledgement signal having a high signal during a blocking period when the clock signal is blocked and utilizes the acknowledgement signal as an announcement to a higher circuit that the clock signal is blocked.

20 Claims, 4 Drawing Sheets

(56) References Cited

U.S. PATENT DOCUMENTS

| | | | |
|---|---|---|---|
| 7,443,222 B1* | 10/2008 | Saxe | G06F 1/04 |
| | | | 327/291 |
| 8,369,477 B2 | 2/2013 | Shibayama | |
| 10,033,362 B1 | 7/2018 | Shan et al. | |
| 10,148,258 B2 | 12/2018 | Carlson et al. | |
| 2008/0309373 A1* | 12/2008 | Hashimoto | G06F 1/08 |
| | | | 326/93 |
| 2010/0097131 A1 | 4/2010 | Bainbridge et al. | |
| 2013/0278231 A1* | 10/2013 | Kuo | H02M 3/156 |
| | | | 327/175 |
| 2020/0150710 A1* | 5/2020 | Kim | G11C 7/222 |
| 2021/0135659 A1* | 5/2021 | Lee | G06F 1/08 |
| 2021/0313975 A1 | 10/2021 | Shan et al. | |
| 2022/0269304 A1* | 8/2022 | Lele | H03K 5/00006 |

OTHER PUBLICATIONS

Shan et. al., ""A Low Overhead, Within-a-Cycle Adaptive Clock Stretching Circuit With Wide Operating" Range in 40-nm CMOS", in IEEE Transactions on Circuits and Systems II: Express Briefs, vol. 65, No. 11, pp. 1718-1722, Nov. 2018 [Abstract Only].

* cited by examiner

CLOCK GATING CIRCUIT FOR AVOIDING OUT-OF-SPEC CLOCK OPERATIONS IN SELF-TIMED CIRCUITS

BACKGROUND

The present invention relates to a clock gating circuit, and more specifically, to a clock gating circuit for avoiding out-of-spec clock operations in a self-timed circuit.

Circuits that operate without relying on global synchronization are known as self-timed or semi-synchronous circuits. The absence of global synchronization avoids the need to have a clock signal arrive simultaneously at all sub-circuits. Comparing with a synchronous circuit, a semi-synchronous circuit still distributes clock signals periodically to each individual sub-circuit though not necessarily to all sub-circuits simultaneously. A semi-synchronous circuit could achieve higher frequency or a smaller clock tree but still has its own drawbacks.

In general, a semi-synchronous circuit initiates a clock operation triggered by an external clock signal and produces an internal completion signal so that the next clock operation may start. Any new clock cycle occurring prior to the completion of the previous clock operation, known as clock mismatch or out-of-spec clock operation, should be blocked in order to allow the circuit enough time to become ready for the next operation. But, out-of-spec clock operations may still occur in several instances. For example, the external clock source may be too fast or the circuit operation may be too slow due to process/voltage/temperature (PVT) variations, or due to device aging. Such a missed clock may result in miscalculation or a physical damage to a system.

Conventional solutions to reduce clock mismatches include stopping a concerned circuit system to re-tune the clocks or selecting a clock phase from multiple clock phases that have been produced in advance. However, the conventional solutions are not easily adaptable when specifications of circuits vary greatly from one to another and still have glitches when clock signals rise or fall.

SUMMARY

According to an embodiment of the present application, a circuit for avoiding out-of-spec clock operations comprises a clock gating section, coupled with an enabling signal controller, gating a clock signal according to an enabling signal generated by the enabling signal controller, wherein the enabling signal controller has a set terminal for receiving a set signal and a reset terminal for receiving a reset signal and generates the enabling signal for the clock gating section according to the set signal and the reset signal; a set signal generator, coupled with the enabling signal controller, generating the set signal for the enabling signal controller; a reset signal generator, coupled with the enabling signal controller, generating the reset signal for the enabling signal controller, wherein the reset signal generator has a first input for receiving an In_Progress signal and a second input for receiving a feedback signal of the enabling signal and generates the reset signal according to the In_Progress signal and the feedback signal; a feedback section, coupled with the reset signal generator and the enabling signal controller, receiving the clock signal and the enabling signal and generating the feedback signal for the reset signal generator according to the clock signal and the enabling signal. According to another embodiment, the enabling signal controller further generates an acknowledgement signal and utilizes the acknowledgement signal as an announcement to a higher circuit that the clock signal is blocked. The acknowledgement signal has a high signal during a blocking period when the clock signal is blocked.

According to another embodiment of the present application, a method of a circuit for avoiding out-of-spec clock operations. The method comprises generating, by an enabling signal controller, an enabling signal and outputting the enabling signal to a clock gating section; gating, by the clock gating section, a clock signal according to the enabling signal, wherein the enabling signal controller has a set terminal for receiving a set signal and a reset terminal for receiving a reset signal and generates the enabling signal for the clock gating section according to the set signal and the reset signal; generating, by a set signal generator, the set signal and outputting the set signal to the enabling signal controller; generating, by a reset signal generator, the reset signal and outputting the reset signal to the enabling signal controller, wherein the reset signal generator has a first input for receiving an In_Progress signal and a second input for receiving a feedback signal of the enabling signal and generates the reset signal according to the In_Progress signal and the feedback signal; and generating, by a feedback section, the feedback signal and outputting the feedback signal to the reset signal generator, wherein the feedback section receives the clock signal and the enabling signal and generates the feedback signal according to the clock signal and the enabling signal. According to another embodiment, the method further comprises generating, by the enabling signal controller, an acknowledgement signal and outputting the acknowledgement signal as an announcement to a higher circuit that the clock signal is blocked. The acknowledgement signal has a high signal during a blocking period when the clock signal is blocked.

DETAILED DESCRIPTION

The present inventive clock gating circuit according to an embodiment of the present application allows a new calculation cycle to start after the previous calculation cycle has completed by temporarily blocking the clock signal based on internal signals. By using a clock enabling signal as a feedback, the present inventive clock gating circuit is capable of avoiding any glitch generated at the instant moment when a clock signal falls or rises. In addition, the present inventive clock gating circuit produces an acknowledgement signal to announce to a higher level unit that periods of a clock signals are blocked. Certain advantages of this present inventive clock gating circuit include saving time and area and allowing an adaptive solution as each unit can make its own locking decisions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, and/or block diagrams of a circuit logic. With respect to any flowcharts, depending upon the technology involved, the operations can be performed in a different order than what is shown in a given flowchart. For example, again depending upon the technology involved, two operations shown in flowchart blocks may be performed in reverse order, as a single integrated step, concurrently, or in a manner at least partially overlapping in time.

Figure 1:
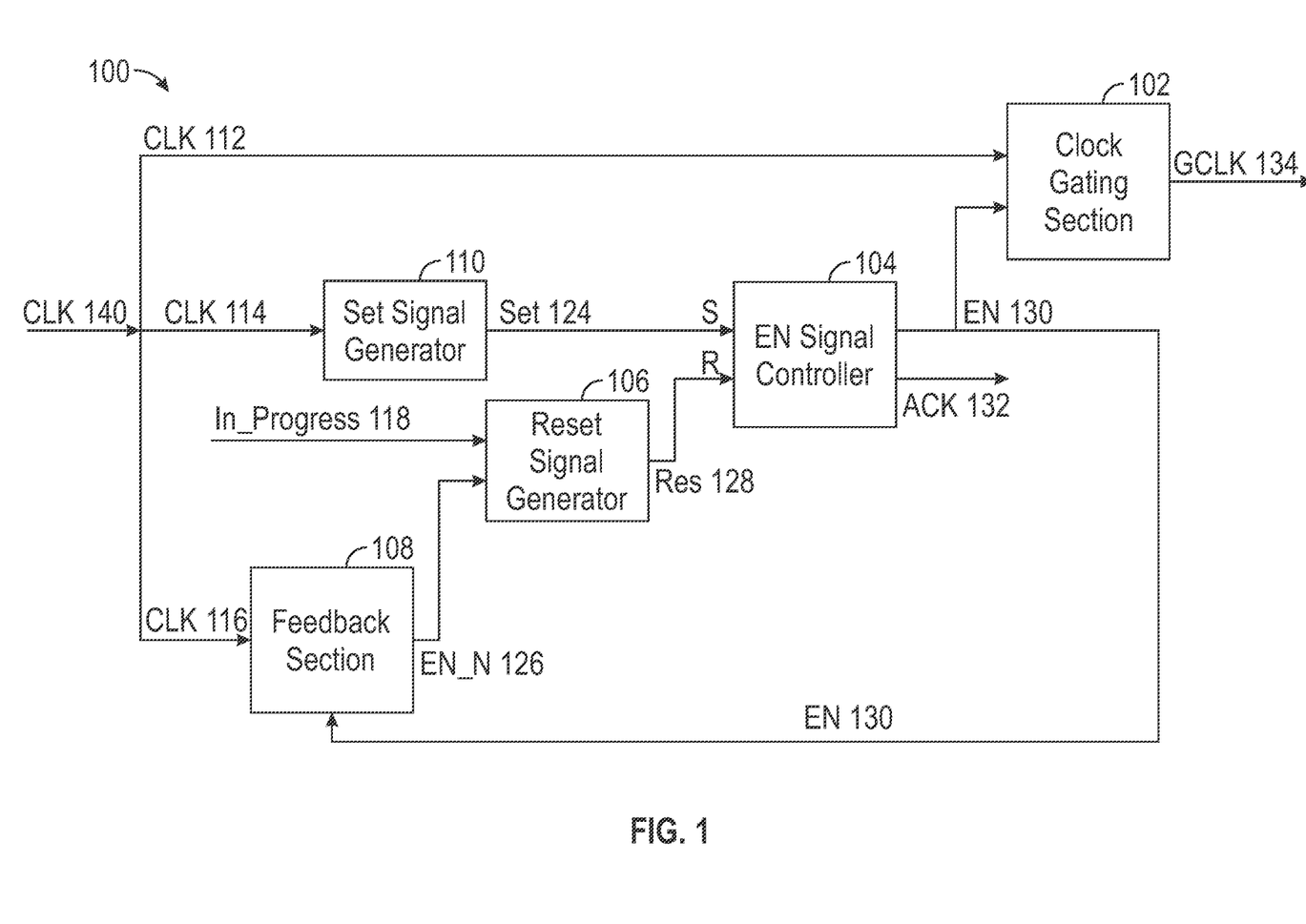
FIG. 1 illustrates a circuit diagram 100 for avoiding out-of-spec clock operations according to an embodiment of the present application.

With reference now to FIG. 1, a circuit diagram 100 for avoiding out-of-spec clock operations controls the output of a clock signal 134 to other sub-circuits that rely on the outputted clock signal 134 for operation. The circuit diagram 100 is configured to receive a clock signal 140 from an external source for the purpose of synchronization, block certain clock signals from the clock signal 140 to avoid out-of-spec operations, and output a gated clock signal 134 to other coupled circuits. To generate the gated clock signal 134, the circuit diagram 100 receives an In_Progress signal 118 that has a high signal period corresponding to the period of an on-going operation by another circuit and uses the high signal period as a blocking period for the received clock signal. The circuit diagram 100 uses both the In_Progress signal 118 and an enabling signal 130 for generating a reset signal 128 of an enabling signal controller 104 that generates the enabling signal 130 to block undesired signals from the clock signal 140.

Figure 3:
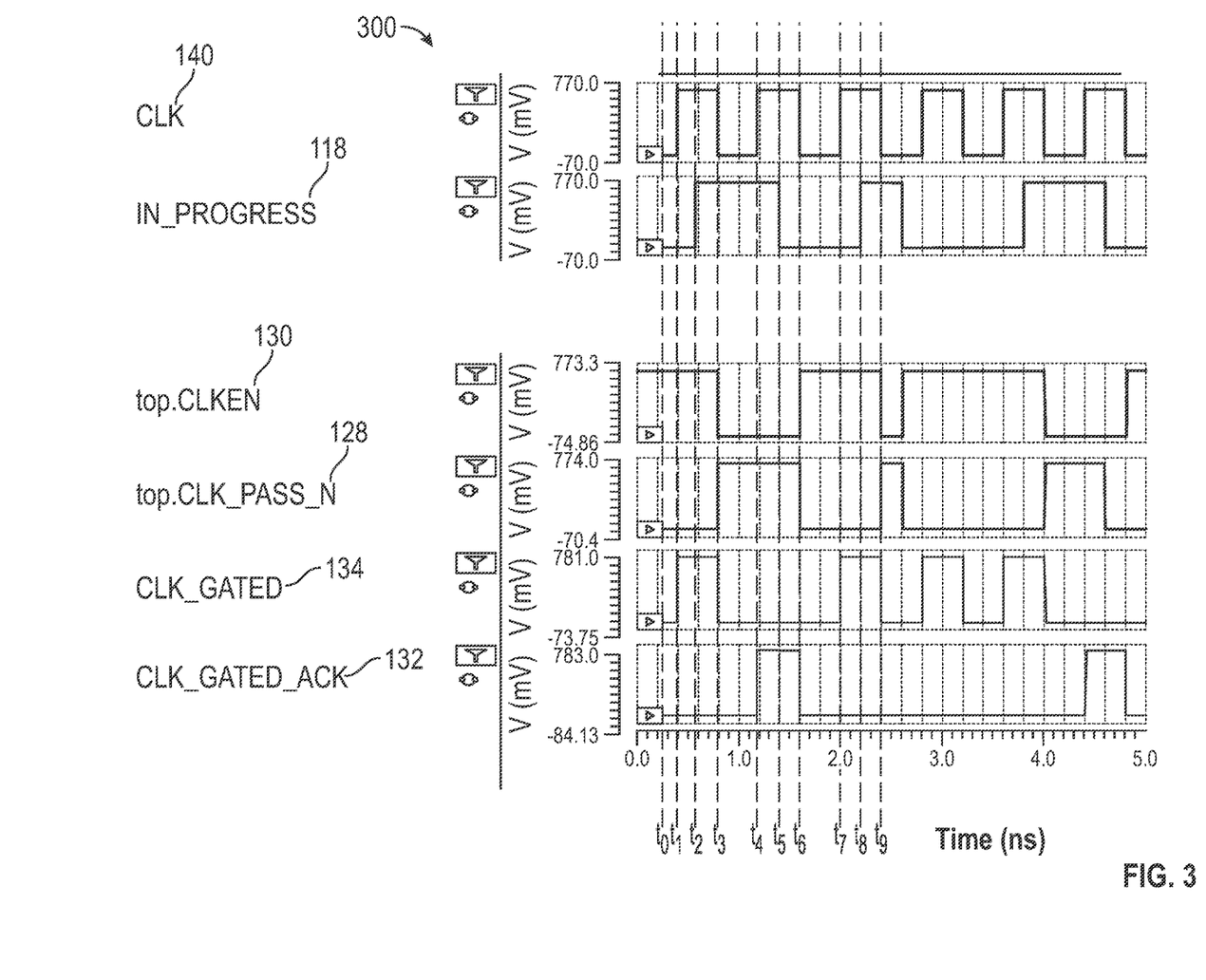
FIG. 3 illustrates various timing signals 300 generated by components of the clock gating circuit 200 according to an embodiment of the present application.

As shown in FIG. 1, the circuit diagram 100 includes the following coupled circuit sections: a clock gating section 102, an enabling signal controller 104, a reset signal generator 106, a feedback section 108, and a set signal generator 110. The clock gating section 102 receives a clock signal 112 and an enabling signal 130 and selectively outputs the clock signal 112 as the gated clock signal 134. The clock signal 112 has an identical form as the received clock signal 140. The enabling signal 130 controls which part of the clock signal 112 is blocked or outputted. According to an embodiment, the enabling signal 130 is in a digital form, in which a high (1) signal enables the output of the clock signal 112 and a low (0) signal blocks the output of the clock signal 112. An example of the enabling signal 130 is shown in FIG. 3 as "top.CLKEN 130." The enabling signal is generated by the enabling signal controller 104. According to an embodiment, the circuit diagram 100 represents a digital circuit, and all signals are in digital forms that have either a high (1) signal or a low (0) signal. FIG. 3 illustrates exemplary signals generated by the circuit diagram 100 according to an embodiment of the present application.

The enabling signal controller 104 includes a Set terminal S and a Reset terminal R and outputs the enabling signal 130 and an acknowledgement signal 132. The acknowledgement signal 132 announces, to a higher level circuit, that certain periods of the clock signal 140 are blocked. The period of the acknowledgement signal 132 corresponds to that of the clock signals that are blocked from the clock signal 112. The enabling signal controller 104 sets the high signal and low signal of the enabling signal 130 according to inputs at the Set terminal S and the Reset terminal R. According to an embodiment, the enabling signal controller 104 is a SR-latch whose outputs (the enabling signal 130 and the acknowledged signal 132) are determined by the following truth Table 1. The word "Latch" in Table 1 represents a memory state that maintains a previous state of the SR-latch.

TABLE 1

A truth table for the Enabling signal controller 104

| S | R | En 130 | ACK 132 |
|---|---|--------|---------|
| 0 | 0 | Latch  | Latch   |
| 0 | 1 | 0      | 1       |
| 1 | 0 | 1      | 0       |
| 1 | 1 | 0      | 0       |

The set signal generator 110 generates a set signal 124 and provides it to the Set terminal S of the enabling signal controller 104. The reset signal generator 106 generates a reset signal 128 and provides it to the reset signal terminal R of the Enabling signal controller 104.

The set signal generator 110 receives a clock signal 114 that is identical to the clock signal 140 and generates the set signal 124. According to an embodiment, the set signal generator 110 uses a NOT gate circuit to generate an inverse of the clock signal 114.

The reset signal generator 106 receives the In_Progress signal 118 and a feedback signal 126 related to the enabling signal 130 and generates the reset signal 128. According to an embodiment, the reset signal generator 106 includes a NAND gate circuit.

The feedback section 108 generates the feedback signal 126 by using a clock signal 116 and the enabling signal 130. The clock signal 116 is identical to the clock signal 140. According to an embodiment, the feedback section includes a NAND gate circuit. The feedback section 108 is configured to avoid disturbing a clock pulse within its period by taking the clock signal 140 and the enabling signal 130 as inputs.

The circuit diagram 100 implements the following overall logic operations to create the enabling signal 130: the enabling signal 130 rises to high when the clock signal falls while the enabling signal 130 falls to low when In_Progress*not(the enabling signal 130).

Figure 2:
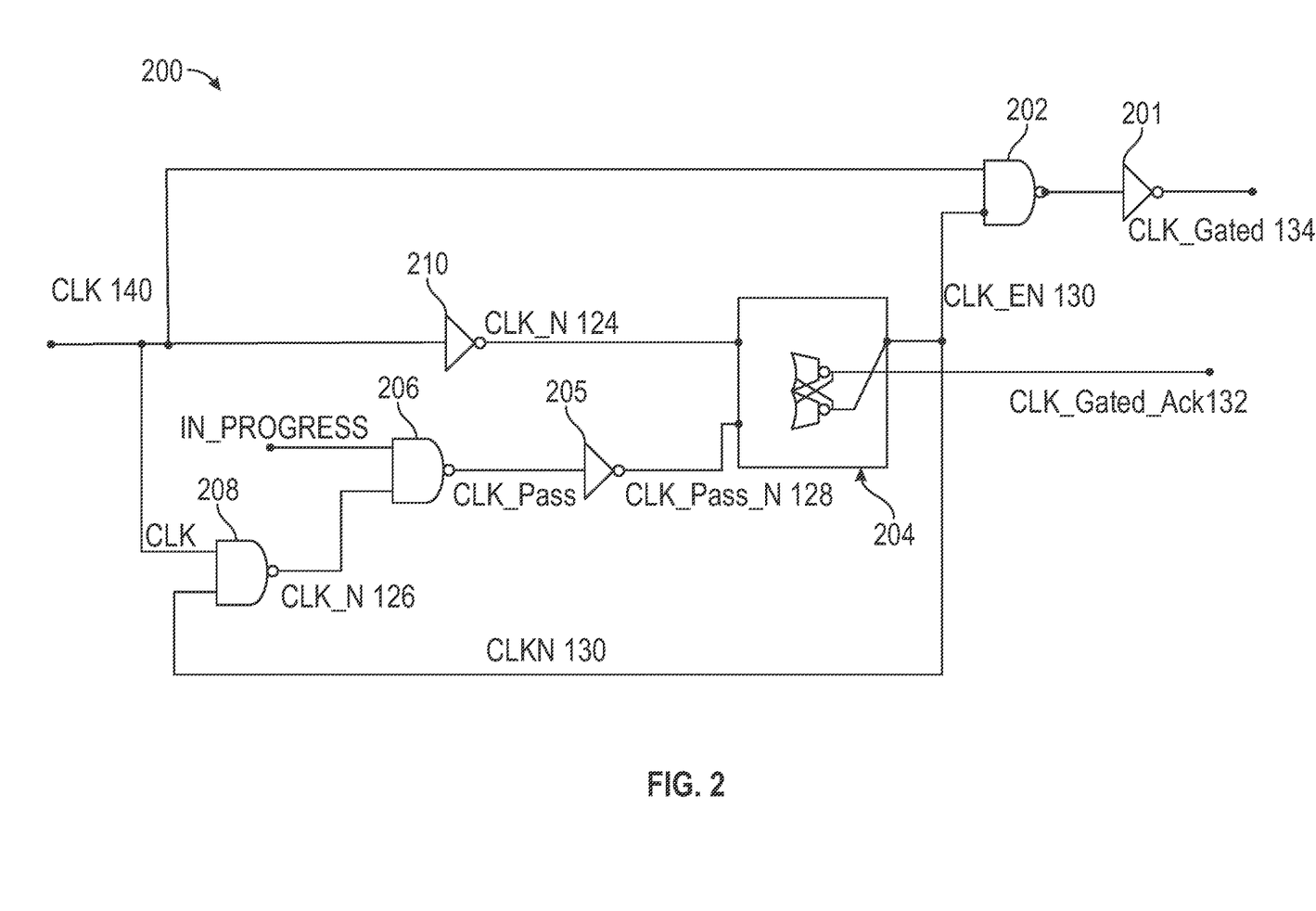
FIG. 2 illustrates a clock gating circuit 200 according to an embodiment of the present application.

With reference now to FIG. 2, a clock gating circuit 200 according to an embodiment of the present application includes: a clock gating section 102 having a NAND gate circuit 202 and a NOT gate circuit 201, an enabling signal controller 104 having a SR-latch circuit 204, a reset signal generator 106 having a NAND gate circuit 206 and a NOT gate circuit 205, a feedback section 108 having a NAND gate circuit 208, and a set signal generator 110 having a NOT gate circuit 210. The labels shown in FIG. 2 are described below:

"CLK_GATED" refers to the gated clock signal 134.
"CLK-EN" refers to the enabling signal 130.
"CLK_GATED_Ack" refers to the acknowledgement signal 132.
"CLK_PASS_N" refers the reset signal 128.
"CLK_N" refers to the feedback signal 126.
"CLK_N" refers to the set signal 124.
"CLK" refers to the clock signal 140.

An operation of the clock gating circuit 200 starts with the input of a clock signal 140 and an In_Progress signal 118. The clock gating circuit 200 splits the clock signal 140 to three identical clock signals: 112, 114, and 116. The clock signal 112 is provided to the NAND gating circuit 202. The clock signal 114 provided to the NOT gate circuit 210 to generate a set signal 124 for the Set terminal S of the SR-latch circuit 204. The clock signal 116 and the enabling signal 130 are input to the NAND gate circuit 208 to generate the feedback signal 126. The In_Progess signal 118 and the feedback signal 126 are input to the NAND gate circuit 206. The output signal of the NAND gate circuit 206 is input to the NOT gate circuit 205 to generate the reset signal 128 for the Reset terminal of the SR-latch circuit 204. Based on the signals at the Set terminal S and the Reset terminal R, the SR-latch circuit 204 generates the enabling signal 130, which is input to both the NAND gate circuit 202 and the NAND gate circuit 208. The SR-latch circuit 204 further generates the acknowledgement signal 132 and outputs it to a higher level circuit.

According to an embodiment, the enabling signal 130 is fed back to the feedback section 108. As the enabling signal 130 is also used to generate the reset signal 128 for the SR-latch circuit 204, it can remove any glitches in the gated clock signal 134 when the clock signal 140 rises or falls.

With reference now to FIG. 3, timing signals 300 demonstrate the operation and advantages of the clock gating circuit 200 according to an embodiment of the present application. The horizontal axis of each signal shows a timeline, and the vertical axis shows a voltage of the signal. A signal is typically formed by pulses. The meanings of each signal are described below:

"CLK:" clock signal 140;
"IN_PROGRESS:" In_Progress signal 118
"top.CLKEN:" the enabling signal 130
"top.CLK_PASS_N:" the reset signal 128
"CLK_GATED:" the gated clock signal 134
"CLK_GATED_ACK:" the acknowledgement signal 132

Among the signals shown in FIG. 3, the clock signal 140 and the In_Progress signal 118 are two inputs to the clock gating circuit 200, and the gated clock signal 134 and the acknowledgement signal 132 are two output signals by the clock gating circuit 200. When the gated clock signal 134 and the acknowledgement signal 132 are combined via an OR gate circuit, the combination produces the clock signal 140. When the clock signal 140 and the enabling signal 130 are combined via an AND gate circuit, the combination produces the gated clock signal 134. The following descriptions explain the magnitude of each signal at various time points.

Initial conditions: The enabling signal 130 has an initial status of high, which indicates no blocking. Both the In_Progress signal 118 and the clock signal 140 are low at the beginning.

At time to, as the clock signal 140 is low, the set signal 124 is high because the NOT gate circuit 210 inverts the clock signal 140 to high. As a result the Set terminal S is high. As the enabling signal 130 is high and the clock signal 116 is low, the feedback signal 126 is high after the NAND gate circuit 208 implements the NAND logic. As the In_Progress signal 118 is low and the feedback signal 126 is high, the reset signal 128 is low after the NAND gate circuit 206 and the NOT gate circuit 205 implement respective logic operations. At the SR-latch circuit 204, the signals at the Set terminal S and the Reset terminal R of the SR-latch 204 are high and low, respectively. According to the above truth Table 1, the enabling signal 130 is set to high, and the acknowledgement signal 132 is set to low. Thus, the NAND gate circuit 202 does not block the clock signal 140 at time to, and the gated clock signal 134 is the same as the clock signal 140 at time to.

At time $t_1$, when the clock signal 140 rises, the set signal 124 is changed to low. As the clock signal 140 is high and the enabling signal 130 is also high, the feedback signal 126 generated by the NAND gate circuit 208 is low. The reset signal 128 is still low because the In_Progress signal 118 is low. At the SR-latch circuit 204, the signals of the S and R terminals are both low, which represent a latch state and do not change the current state of the enabling signal 130. The enabling signal 130 remains high and the acknowledgement signal 132 remains low. Again, the NAND gate circuit 202 does not block the clock signal 140 at time $t_1$, and the gate clock signal is the same as the clock signal 140.

At time $t_2$, the In_Progress signal 118 rises. As the clock signal 140 is high, the reset signal 128 remains low. The feedback signal 126 remains low as both the clock signal 140 and the enabling signal 130 are high at the inputs of the NAND gate circuit 208. The reset signal 128 remains low because the feedback signal 126 is low. At the SR-latch circuit 204, the signals of the S and R terminals are both low, which represent a latch state and do not change the current status of the enabling signal 130. The enabling signal 130 remains high and the acknowledgement signal 132 remains low. Again, the NAND gate circuit 202 does not block the clock signal 140 at time $t_2$, and the gate clock signal is the same as the clock signal 140.

At time $t_3$, when the clock signal 140 falls, the set signal 124 becomes high because of the NOT gate circuit 210. The feedback signal 126 becomes high because the clock signal 140 is low at the input of the NAND gate circuit 208. Then, the reset signal 128 becomes high because both the In_Progress signal 118 and the feedback signal 126 are high. At the SR-latch circuit 204, the signals of the S and R terminals are both high. According to the truth Table 1, when both the Set terminal S and the Reset terminal R are high, the enabling signal 130 will be set to low, and the acknowledgement signal will also be set to low. As the enabling signal 130 becomes low at time $t_3$, the NAND gate circuit 202 starts blocking the clock signal 140 at time $t_3$, and the acknowledgement signal 132 remains low. After the enabling signal 130 becomes low at time $t_3$ and is sent back to the NAND gate circuit 208, the feedback signal 126 remains high and will not further change the operation of the circuit.

At time $t_4$, when the clock signal 140 rises again while the In_Progress signal 118 remains high, the set signal 124 becomes low due to the NOT gate circuit 210. The feedback signal 126 remains high because the enabling signal 130 is low. The reset signal 128 remains high because both the In_Progress signal 118 and the feedback signal 126 are high. At the SR-latch circuit 204, the signals of the S and R terminals are low and high, respectively. According to the truth Table 1, the enabling signal 130 remains low, and the NAND gate circuit 202 continues blocking the clock signal 140 at time $t_4$. The acknowledgement signal 132 is changed from low to high.

At time $t_5$, the In_Progress signal 118 falls while the clock signal 140 remains high. The set signal 124 remains low as the clock signal 140 is not changed. The feedback signal 126 remains high because the enabling signal 130 is still low. The reset signal 128 becomes low because the In_Progress signal 118 becomes low. At the SR-latch circuit 204, the signals of the S and R terminals are now both low. According to the truth Table 1, the SR-latch circuit 204 is at a latch state where both the enabling signal 130 and the acknowledgement signal 132 keep the current status. As the enabling signal 130 remains low, the NAND gate circuit 202 continues blocking the clock signal 140 at time $t_5$, and the acknowledgement signal 132 remains high.

At time $t_6$, when the clock signal 140 falls after the In_Progress signal 118 falls, the set signal 124 becomes high due to the NOT gate circuit 210. The feedback signal 126 becomes high because both the clock signal 140 and the enabling signal 130 are low at the NAND gate circuit 208. As the In_Progress signal 118 is low, the reset signal 128 is also low. At the SR-latch circuit 204, the signals at the S and R terminals are high and low, respectively. According to the truth Table 1, the enabling signal 130 is set to high, and the acknowledgement signal 132 is set to low. As a result, the NAND gate circuit 202 stops blocking the clock signal 140. After the enabling signal 130 is sent back to the NAND gate circuit 208, it does not change the feedback signal 126 because the clock signal 140 is low.

Time points $t_7$, $t_8$, $t_9$ represent similar situation as time points $t_1$, $t_2$, and $t_3$, respectively, and signal changes are identical to those time points too.

Figure 4:
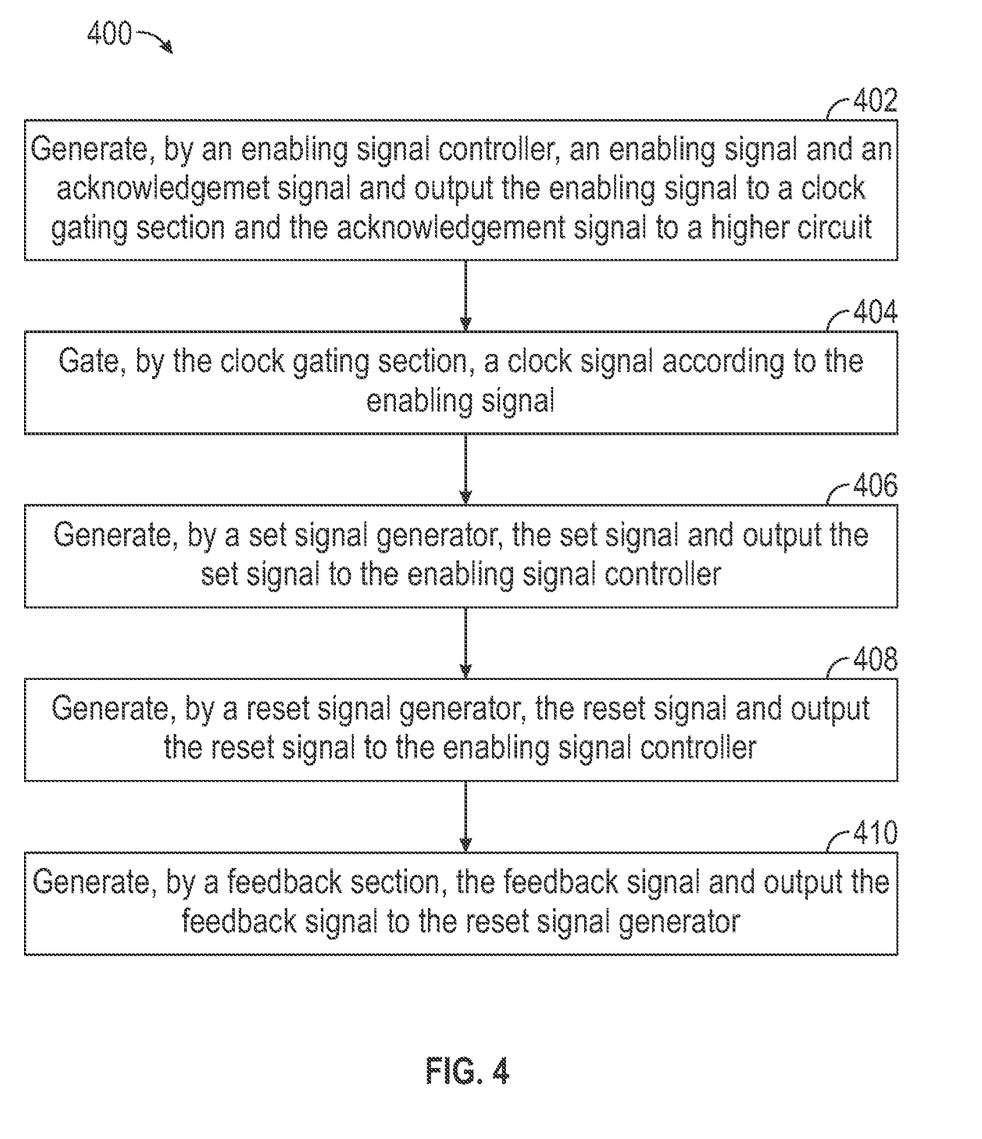
FIG. 4 illustrates a method 400 for avoiding out-of-spec clock operations according to an embodiment of the present application.

With reference now to FIG. 4, a method 400 for avoiding out-of-spec clock operations is described according to an embodiment of present application. The method 400 includes a step 402 for generating, by an enabling signal controller, an enabling signal and outputting the enabling signal to a clock gating section; a step 404 for gating, by the clock gating section, a clock signal according to the enabling signal, wherein the enabling signal controller has a set terminal for receiving a set signal and a reset terminal for receiving a reset signal and generates the enabling signal for the clock gating section according to the set signal and the reset signal; a step 406 for generating, by a set signal generator, the set signal and outputting the set signal to the enabling signal controller; a step 408 for generating, by a reset signal generator, the reset signal and outputting the reset signal to the enabling signal controller, wherein the reset signal generator has a first input for receiving an In_Progress signal and a second input for receiving a feedback signal of the enabling signal and generates the reset signal according to the In_Progress signal and the feedback signal; and a step 410 for generating, by a feedback section, the feedback signal and outputting the feedback signal to the reset signal generator, wherein the feedback section receives the clock signal and the enabling signal and generates the feedback signal according to the clock signal and the enabling signal.

According to various embodiments of the present application, the method 400 further generates, by the set signal generator, an inverted clock signal of the clock signal as the set signal for the enabling signal controller, inputs the clock signal and the enabling signal to a first NAND gate circuit of the feedback section to generate the feedback signal, inputs the In_Progress signal and the feedback signal to a second NAND gate circuit of the reset signal generator to generate the reset signal for the enabling signal controller, inverts, by a second NOT gate circuit of the reset signal generator, a signal output by the second NAND gate circuit, and sets a period in the In_Progress signal according to an on-going operation of another circuit, blocks the clock signal according to the period in the In_Progress signal. The method 400 further generates an acknowledgement signal having a high signal during a period when the clock signal is blocked. The method 400 utilizes a SR latch circuit in the enabling signal controller; and sets both the enabling signal and the acknowledgement signal to low when both the set signal and the reset signal are high.

While the foregoing is directed to embodiments of the present invention, other and further embodiments of the invention may be devised without departing from the basic scope thereof, and the scope thereof is determined by the claims that follow.

What is claimed is:

1. A circuit for avoiding out-of-spec clock operations, comprising:
   a clock gating section, coupled with an enabling signal controller, arranged to gate a clock signal according to an enabling signal generated by the enabling signal controller, wherein the enabling signal controller has a set terminal for receiving a set signal and a reset terminal for receiving a reset signal and is arranged to generate the enabling signal for the clock gating section according to the set signal and the reset signal;
   a set signal generator, coupled with the enabling signal controller, arranged to generate the set signal for the enabling signal controller;
   a reset signal generator, coupled with the enabling signal controller, arranged to generate the reset signal for the enabling signal controller, wherein the reset signal generator has a first input for receiving an In_Progress signal and a second input for receiving a feedback signal of the enabling signal and is arranged to generate the reset signal according to the In_Progress signal and the feedback signal; and
   a feedback section, coupled with the reset signal generator and the enabling signal controller, arranged to receive the clock signal and the enabling signal and to generate the feedback signal for the reset signal generator according to the clock signal and the enabling signal.

2. The circuit according to claim 1, wherein the set signal generator includes a first NOT gate circuit that generates an inverse of the clock signal as the set signal for the enabling signal controller.

3. The circuit according to claim 1, wherein the feedback section includes a first NAND gate circuit that receives the clock signal and the enabling signal as inputs and generates the feedback signal.

4. The circuit according to claim 1, wherein the reset signal generator includes a second NAND gate circuit that receives the In_Progress signal and the feedback signal and generates the reset signal for the enabling signal controller.

5. The circuit according to claim 4, wherein the reset signal generator further includes a second NOT gate circuit coupled with both the second NAND gate circuit and the enabling signal controller.

6. The circuit according to claim 4, wherein the In_Progress signal includes a blocking period associated with an on-going operation of another circuit.

7. The circuit according to claim 6, wherein the clock gating section blocks the clock signal during the blocking period.

8. The circuit according to claim 1, wherein the enabling signal controller is arranged to generate an acknowledgement signal, the acknowledgement signal having a high signal during a blocking period when the clock signal is blocked.

9. The circuit according to claim 8, wherein a combination between the acknowledgement signal and the gated clock signal forms the clock signal.

10. The circuit according to claim 9, wherein the enabling signal controller includes a SR-latch circuit.

11. The circuit according to claim 9, wherein the enabling signal controller is arranged to set both the enabling signal and the acknowledgement signal to low when both the set signal and the reset signal are high.

12. A method of a circuit for avoiding out-of-spec clock operations, the method comprising:
   generating, by an enabling signal controller, an enabling signal and outputting the enabling signal to a clock gating section;
   gating, by the clock gating section, a clock signal according to the enabling signal, wherein the enabling signal controller has a set terminal for receiving a set signal and a reset terminal for receiving a reset signal and generates the enabling signal for the clock gating section according to the set signal and the reset signal;
   generating, by a set signal generator, the set signal and outputting the set signal to the enabling signal controller;
   generating, by a reset signal generator, the reset signal and outputting the reset signal to the enabling signal controller, wherein the reset signal generator has a first input for receiving an In_Progress signal and a second input for receiving a feedback signal of the enabling signal and generates the reset signal according to the In_Progress signal and the feedback signal; and
   generating, by a feedback section, the feedback signal and outputting the feedback signal to the reset signal generator, wherein the feedback section receives the clock signal and the enabling signal and generates the feedback signal according to the clock signal and the enabling signal.

13. The method according to claim 12, further comprising:
   generating, by the set signal generator, an inverse of the clock signal as the set signal for the enabling signal controller.

14. The method according to claim 12, further comprising:
   inputting the clock signal and the enabling signal to a first NAND gate circuit of the feedback section to generate the feedback signal.

15. The method according to claim 12, further comprising:
   inputting the In_Progress signal and the feedback signal to a second NAND gate circuit of the reset signal generator to generate the reset signal for the enabling signal controller.

16. The method according to claim 15, further comprising:
   inverting, by a NOT gate circuit of the reset signal generator, a signal output by the second NAND gate circuit.

17. The method according to claim 15, further comprising:
   setting a period in the In_Progress signal according to an on-going operation of another circuit.

18. The method according to claim 17, further comprising:
   blocking the clock signal according to the period in the In_Progress signal.

19. The method according to claim 12, further comprising:
   generating an acknowledgement signal having a high signal during a period when the clock signal is blocked.

20. The method according to claim 19, further comprising:
   utilizing a SR-latch circuit in the enabling signal controller; and
   setting both the enabling signal and the acknowledgement signal to low when both the set signal and the reset signal are high.

* * * * *